US012749040B2

(12) United States Patent
Hachikawa et al.

(10) Patent No.: US 12,749,040 B2
(45) Date of Patent: Sep. 29, 2026

(54) STATE ESTIMATION APPARATUS, STATE ESTIMATION METHOD, NON-TRANSITORY COMPUTER-READABLE STORAGE MEDIUM STORING COMPUTER PROGRAM, AND STATE ESTIMATION SYSTEM

(71) Applicant: SUMITOMO ELECTRIC INDUSTRIES, LTD., Osaka (JP)

(72) Inventors: Takeshi Hachikawa, Osaka (JP); Shigeki Nishimura, Osaka (JP); Norio Korekawa, Osaka (JP); Tomoyuki Kitada, Osaka (JP); Yu Urata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 401 days.

(21) Appl. No.: 18/569,329

(22) PCT Filed: May 16, 2022

(86) PCT No.: PCT/JP2022/020314

§ 371 (c)(1),
(2) Date: Dec. 12, 2023

(87) PCT Pub. No.: WO2023/281919

PCT Pub. Date: Jan. 12, 2023

(65) Prior Publication Data

US 2024/0378544 A1 Nov. 14, 2024

(30) Foreign Application Priority Data

Jul. 9, 2021 (JP) ................................ 2021-113935

(51) Int. Cl.
*G06Q 10/0833* (2023.01)
*G01P 3/00* (2006.01)
(Continued)

(52) U.S. Cl.
CPC ............ *G06Q 10/0833* (2013.01); *G01P 3/00* (2013.01); *G01P 15/18* (2013.01); *H04W 76/20* (2018.02)

(58) Field of Classification Search
CPC ...... G06Q 10/0833; G06Q 10/08; G01P 3/00; G01P 15/18; H04W 76/20
See application file for complete search history.

(56) References Cited

U.S. PATENT DOCUMENTS

2021/0035064 A1* 2/2021 Nishikawa ............. A61B 5/024

FOREIGN PATENT DOCUMENTS

CN 111275372 A * 6/2020 ......... G06Q 10/0833
JP 2005-251073 A 9/2005

(Continued)

*Primary Examiner* — Timothy P Graves
(74) *Attorney, Agent, or Firm* — Oliff PLC

(57) ABSTRACT

A state estimation apparatus includes a first acquisition unit configured to acquire a measurement result of a first sensor, the first sensor being a sensor mounted in a vehicle in which a worker is to ride and being configured to measure a state of the vehicle, a second acquisition unit configured to acquire a measurement result of a second sensor, the second sensor being a sensor carried by the worker and being configured to measure a state of the worker, and an estimation unit configured to estimate, based on the measurement result of the first sensor and the measurement result of the second sensor, a state related to work of the worker.

18 Claims, 12 Drawing Sheets

(51) Int. Cl.
*G01P 15/18* (2013.01)
*H04W 76/20* (2018.01)

(56) References Cited

FOREIGN PATENT DOCUMENTS

| | | | | |
|---|---|---|---|---|
| JP | 2013180867 | A | * | 9/2013 |
| JP | 2017151846 | A | * | 8/2017 |
| JP | 2019-028979 | A | | 2/2019 |
| JP | 2019128642 | A | * | 8/2019 |
| JP | 2020-165687 | A | | 10/2020 |

* cited by examiner

STATE ESTIMATION APPARATUS, STATE ESTIMATION METHOD, NON-TRANSITORY COMPUTER-READABLE STORAGE MEDIUM STORING COMPUTER PROGRAM, AND STATE ESTIMATION SYSTEM

TECHNICAL FIELD

The present disclosure relates to a state estimation apparatus, a state estimation method, a computer program, and a state estimation system. This application claims priority based on Japanese Patent Application No. 2021-113935 filed on Jul. 9, 2021, and the entire contents of the Japanese patent application are incorporated herein by reference.

BACKGROUND ART

PTL 1 discloses that a worker inputs a work state such as unloading or resting by pressing an operation state input switch. PTL 2 discloses that a worker inputs information related to a cargo handling state by using an information terminal.

CITATION LIST

Patent Literature

PTL 1: Japanese Unexamined Patent Application Publication No. 2005-251073

PTL 2: Japanese Unexamined Patent Application Publication No. 2019-28979

SUMMARY OF INVENTION

A state estimation apparatus according to an aspect of the present disclosure includes a first acquisition unit configured to acquire a measurement result of a first sensor, the first sensor being a sensor mounted in a vehicle in which a worker is to ride and being configured to measure a state of the vehicle, a second acquisition unit configured to acquire a measurement result of a second sensor, the second sensor being a sensor carried by the worker and being configured to measure a state of the worker, and an estimation unit configured to estimate, based on the measurement result of the first sensor and the measurement result of the second sensor, a state related to work of the worker.

A state estimation method according to another aspect of the present disclosure includes acquiring, by a state estimation apparatus, a measurement result of a first sensor, the first sensor being a sensor mounted in a vehicle in which a worker is to ride and being configured to measure a state of the vehicle; acquiring, by the state estimation apparatus, a measurement result of a second sensor, the second sensor being a sensor carried by the worker and being configured to measure a state of the worker; and estimating, by the state estimation apparatus, based on the measurement result of the first sensor and the measurement result of the second sensor, a state related to work of the worker.

A computer program according to another aspect of the present disclosure is a computer program for causing a computer to function as a first acquisition unit configured to acquire a measurement result of a first sensor, the first sensor being a sensor mounted in a vehicle in which a worker is to ride and being configured to measure a state of the vehicle; a second acquisition unit configured to acquire a measurement result of a second sensor, the second sensor being a sensor carried by the worker and being configured to measure a state of the worker; and an estimation unit configured to estimate, based on the measurement result of the first sensor and the measurement result of the second sensor, a state related to work of the worker.

A state estimation system according to another aspect of the present disclosure includes a vehicle-mounted apparatus mounted in a vehicle in which a worker is to ride and configured to provide a measurement result about a state of the vehicle, a terminal carried by the worker and configured to provide a measurement result about a state of the worker, and a state estimation apparatus configured to estimate, based on the measurement result provided by the vehicle-mounted apparatus and the measurement result provided by the terminal, a work state of the worker.

DETAILED DESCRIPTION

Figure 1:
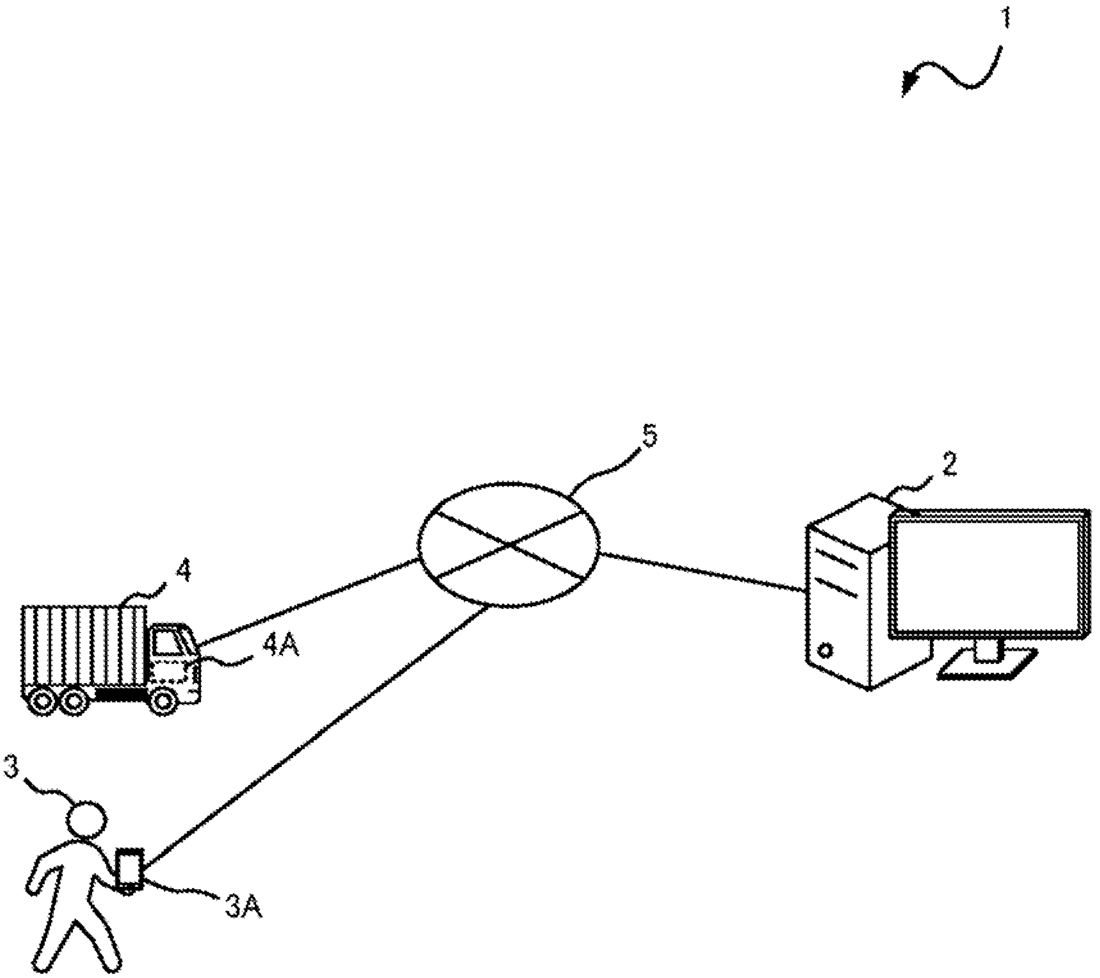
FIG. 1 is a diagram showing an overall configuration of a scheduled and actual management system according to an embodiment 1 of the present disclosure.

Problems to be Solved by Present Disclosure

Conventionally, there is known a delivery plan system that plans a delivery route of a package to a delivery destination, an scheduled arrival time, an estimated stay time at a delivery destination, and the like. The estimated stay time includes an estimated waiting time and an estimated work time at the delivery destination after arrival at the delivery destination.

When such a delivery plan is unreasonable, a mechanism for analyzing the cause and improving the delivery plan to a new delivery plan is required. For the cause analysis, it is necessary to accurately specify an actual arrival time of a worker at a delivery destination, an actual standby time and an work record time of the worker at the delivery destination, and an actual departure time of the worker from the delivery destination.

As a method for specifying the work record time, methods described in PTLs 1 and 2 are known. These methods require a worker to input information about work using a switch or a terminal. For this reason, the worker is burdened with input. In addition, when an input omission or an input error by the worker occurs, the work record time cannot be accurately specified.

The present disclosure has been made in view of such circumstances, and it is an object of the present disclosure to provide a state estimation apparatus, a state estimation method, a computer program, and a state estimation system capable of accurately estimating a state related to work of a worker without imposing a burden of information input on a user.

Advantageous Effects of Present Disclosure

According to the present disclosure, it is possible to accurately estimate a state related to work of a worker without imposing a burden of information input on a user.

Summary of Embodiments of Present Disclosure

First, a summary of embodiments of the present disclosure is listed and described.

(1) A state estimation apparatus according to an embodiment of the present disclosure includes a first acquisition unit configured to acquire a measurement result of a first sensor, the first sensor being a sensor mounted in a vehicle in which a worker is to ride and being configured to measure a state of the vehicle, a second acquisition unit configured to acquire a measurement result of a second sensor, the second sensor being a sensor carried by the worker and being configured to measure a state of the worker, and an estimation unit configured to estimate, based on the measurement result of the first sensor and the measurement result of the second sensor, a state related to work of the worker.

According to this configuration, it is possible to estimate the state related to work of the worker based on the measurement result about the state of the vehicle and the measurement result about the state of the worker. Here, the measurement result about the state of the vehicle and the measurement result about the state of the worker can be automatically acquired from the first sensor and the second sensor, respectively. Therefore, it is possible to accurately estimate the state related to work of the worker without imposing a burden of information input on the user.

(2) In addition, the measurement result of the first sensor may be a position of the vehicle, the measurement result of the second sensor may be a position of the worker, and the estimation unit may be configured to estimate, a state related to a ride of the worker in the vehicle.

According to this configuration, for example, when the distance between the vehicle and the worker is less than a distance threshold, it can be estimated that the worker is riding in the vehicle, and when the distance is equal to or more than the distance threshold, it can be estimated that the worker is absent in the vehicle. Thus, the time when it is determined that the worker is riding in the vehicle can be excluded from the work time of the worker.

(3) In addition, the estimation unit may be configured to estimate, based on a change in a distance between the vehicle and the worker, the state of a ride of the worker in the vehicle.

According to this configuration, for example, when the distance between the vehicle and the worker changes from equal to or more than the distance threshold to less than the distance threshold, it can be estimated that the worker has ridden in the vehicle, and when the distance changes from less than the distance threshold to equal to or more than the distance threshold, it can be estimated that the worker has been absent in the vehicle. This makes it possible to accurately estimate the ride and absence of the worker in the vehicle.

(4) In addition, the state estimation apparatus may further include a connection state acquisition unit configured to acquire a connection state in wireless communication between a communication device mounted in the vehicle and a communication device carried by the worker. The estimation unit may be configured to estimate, based on the acquired connection state, a state of a ride or absence of the worker in the vehicle.

According to this configuration, for example, when two communication devices are connected by the near field communication, it can be estimated that the worker is riding in the vehicle, and when communication between the two communication devices is disconnected, it can be estimated that the worker is absent in the vehicle.

(5) In addition, the measurement result of the second sensor may be at least one of a velocity, an acceleration, an angular velocity, or an altitude of the worker, and the estimation unit may be configured to estimate, based on a measurement result about at least one of the velocity, the acceleration, the angular velocity, or the altitude of the worker, a state of work or standby of the worker.

According to this configuration, by performing threshold process on the measurement result about at least one of the velocity, the acceleration, the angular velocity, and the altitude of the worker, it is possible to separate the measurement result when the worker is working from the measurement result when the worker is standing by. As a result, the state of work or standby of the worker can be accurately estimated.

(6) In addition, the estimation unit is configured to estimate the state of work or standby of the worker within a time range in which the worker is estimated to be absent in the vehicle.

According to this configuration, the time range for estimating the state of work or standby of the worker can be limited, and thus the state of work or standby of the worker can be accurately estimated.

(7) In addition, the measurement result of the first sensor may be a velocity of the vehicle, and the estimation unit may be configured to estimate, based on a measurement result about the velocity of the vehicle, a state of movement of the worker by the vehicle.

According to this configuration, by performing threshold process on the measurement result about the velocity of the vehicle, it is possible to separate the measurement result when the vehicle is traveling from the measurement result when the vehicle is stopped. Accordingly, it is possible to accurately estimate the state of traveling or stopped of the vehicle in which the worker rides.

(8) In addition, the state estimation apparatus may further include an analysis unit configured to analyze, based on the state related to work of the worker estimated by the estimation unit and a delivery plan of the vehicle, a relationship between the delivery plan and a delivery record, and to output an analysis result.

According to this configuration, it is possible to use the analysis result of the delivery plan and the delivery record for planning a next delivery plan.

(9) A state estimation method according to another embodiment of the present disclosure includes acquiring, by a state estimation apparatus, a measurement result of a first sensor, the first sensor being a sensor mounted in a vehicle in which a worker is to ride and being configured to measure a state of the vehicle; acquiring, by the state estimation apparatus, a measurement result of a second sensor, the second sensor being a sensor carried by the worker and being configured to measure a state of the worker; and estimating, by the state estimation apparatus, based on the measurement result of the first sensor and the measurement result of the second sensor, a state related to work of the worker.

This configuration includes the process in the state estimation apparatus described above as steps. Therefore, according to this configuration, it is possible to achieve the same operation and effect as those of the state estimation apparatus described above.

(10) A computer program according to another embodiment of the present disclosure is a computer program for causing a computer to function as a first acquisition unit configured to acquire a measurement result of a first sensor, the first sensor being a sensor mounted in a vehicle in which a worker is to ride and being configured to measure a state of the vehicle; a second acquisition unit configured to acquire a measurement result of a second sensor, the second sensor being a sensor carried by the worker and being configured to measure a state of the worker; and an estimation unit configured to estimate, based on the measurement result of the first sensor and the measurement result of the second sensor, a state related to work of the worker.

According to this configuration, the computer can be caused to function as the state estimation apparatus described above. Therefore, it is possible to achieve the same operation and effect as those of the state estimation apparatus described above.

(11) A state estimation system according to another embodiment of the present disclosure includes a vehicle-mounted apparatus, the vehicle-mounted apparatus being a sensor mounted in a vehicle in which a worker is to ride and configured to provide a measurement result about a state of the vehicle, a terminal being a sensor carried by the worker and being configured to provide a measurement result about a state of the worker, and a state estimation apparatus configured to estimate, based on the measurement result provided by the vehicle-mounted apparatus and the measurement result provided by the terminal, a work state of the worker.

According to this configuration, it is possible to estimate the state related to work of the worker based on the measurement result about the state of the vehicle and the measurement result about the state of the worker. Here, the measurement result about the state of the vehicle and the measurement result about the state of the worker can be automatically acquired from the vehicle-mounted apparatus and the terminal, respectively. Therefore, it is possible to accurately estimate the state related to work of the worker without imposing a burden of information input on the user.

DETAILS OF EMBODIMENTS OF PRESENT DISCLOSURE

Embodiments of the present disclosure will now be described with reference to the drawings. It should be noted that each of the embodiments described below represents a specific example of the present disclosure. Numerical values, shapes, materials, constituent elements, arrangement positions and connection forms of constituent elements, steps, order of steps, and the like shown in the following embodiments are examples and do not limit the present disclosure. In addition, among the constituent elements in the following embodiments, constituent elements not recited in the independent claims are constituent elements that can be arbitrarily added. In addition, each drawing is a schematic diagram and is not necessarily strictly illustrated.

The same components are denoted by the same reference numerals. Since their functions and names are the same, their descriptions are omitted as appropriate.

Embodiment 1

Overall Configuration of Scheduled and Actual Management System

FIG. 1 is a diagram showing an overall configuration of a scheduled and actual management system which is a work-related state estimation system according to the embodiment 1 of the present disclosure. Referring to FIG. 1, a scheduled and actual management system 1 is a system for managing delivery plan information indicating a delivery plan of a package by a vehicle 4 and work record information indicating a work record of a worker 3, and includes a scheduled and actual analysis apparatus 2 which is a work-related state estimation apparatus (state estimation apparatus), a terminal 3A carried by worker 3, and a vehicle-mounted apparatus 4A mounted in vehicle 4.

Scheduled and actual analysis apparatus 2 detects a temporal difference between the delivery plan and the work record based on delivery plan information of the package by vehicle 4 and work record information of worker 3, and analyzes a cause of the temporal difference based on a detection result. Scheduled and actual analysis apparatus 2 transmits to a delivery plan creation apparatus (not shown) that creates a delivery plan. Upon receiving the analysis result, the delivery plan creation apparatus corrects the next and subsequent delivery plan information based on the analysis result.

Terminal 3A includes a sensor that measures a position and an acceleration of terminal 3A (i.e., the position and the acceleration of worker 3 carrying terminal 3A). That is, terminal 3A includes a position sensor for measuring the position of terminal 3A and an acceleration sensor for measuring the acceleration of terminal 3A. The position sensor determines the position of terminal 3A using a satellite navigation. For example, the position sensor specifies the position of terminal 3A based on radio waves received from a plurality of Global Positioning System (GPS) satellites. The position of terminal 3A can be specified by, for example, latitude and longitude. The satellite navigation uses a satellite positioning system such as GPS, but is not limited thereto, and may use a satellite positioning system such as Michibiki or Galileo. These satellite positioning systems are collectively referred to as a Global Navigation Satellite System (GNSS).

Terminal 3A measures the position and the acceleration of worker 3 at predetermined time intervals and transmits the measurement result to scheduled and actual analysis apparatus 2 via a network 5.

Vehicle-mounted apparatus 4A includes a sensor that measures a position and a velocity of vehicle-mounted apparatus 4A (i.e., the position and the velocity of vehicle 4 in which vehicle-mounted apparatus 4A is mounted). That is, vehicle-mounted apparatus 4A includes a position sensor for measuring the position of vehicle-mounted apparatus 4A and a velocity sensor for measuring the velocity of vehicle-mounted apparatus 4A. The position sensor determines the position of vehicle-mounted apparatus 4A using a satellite navigation. For example, the position sensor specifies the position of vehicle-mounted apparatus 4A based on radio waves received from a plurality of GPS satellites. The position of vehicle-mounted apparatus 4A can be specified by, for example, latitude and longitude. The satellite navigation uses a satellite positioning system such as GPS, but is not limited thereto, and may use a satellite positioning system such as Michibiki or Galileo.

Vehicle-mounted apparatus 4A measures a position and a velocity of vehicle 4 at predetermined time intervals and transmits the measurement result to scheduled and actual analysis apparatus 2 via network 5.

Scheduled and actual analysis apparatus 2, terminal 3A, and vehicle-mounted apparatus 4A are connected to network 5 such as the Internet in a wired or wireless manner and can transmit and receive data from each other.

Comparison Between Delivery Scheduled and Actual Work Result

Figure 2:
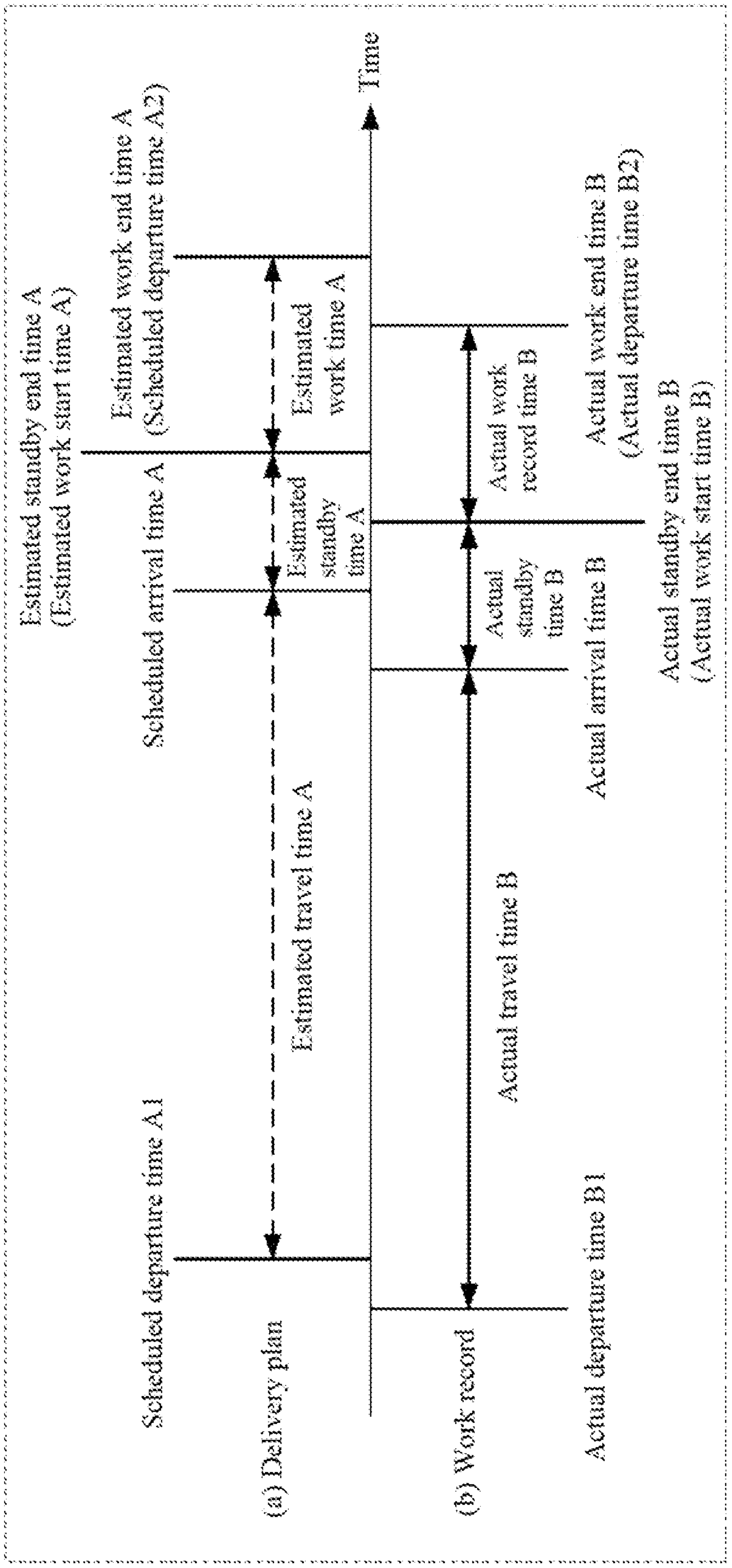
FIG. 2 is a diagram to compare and explain a delivery plan of a package indicated by a delivery plan information and a work record of a worker indicated by a work record information.

FIG. 2 is a diagram to compare and explain (a) a delivery plan of a package indicated by a delivery plan information and (b) a work record of worker 3 indicated by a work record information.

According to (a) the delivery plan of FIG. 2, worker 3 rides in vehicle 4, departs from the departure point at a scheduled departure time A1, and arrives at the delivery destination at the scheduled arrival time A after the elapse of an estimated travel time A. Further, worker 3 stands by at the delivery destination for the estimated waiting time A from the scheduled arrival time A to an estimated standby end time A. Here, the estimated standby end time A becomes an estimated work start time A, and worker 3 performs work such as loading or unloading at the delivery destination for the estimated work time A from the estimated work start time A to an estimated work end time A. Here, the estimated work end time A becomes a scheduled departure time A2, and worker 3 rides in vehicle 4, departs from the delivery destination at the scheduled departure time A2, and goes to the next delivery destination.

In addition, according to (b) the work record of FIG. 2, worker 3 rode in vehicle 4, departed from the departure point at an actual departure time B1, and arrived at the delivery destination at an actual arrival time B after the elapse of the actual travel time B. Further, worker 3 stood by at the delivery destination for the actual standby time B from the actual arrival time B to an actual standby end time B. Here, the actual standby end time B became an actual work start time B, and worker 3 performed work such as loading or unloading at the delivery destination for the work record time B from the actual work start time B to an actual work end time B. Here, the actual work end time B becomes an actual departure time B2, and worker 3 rode in vehicle 4, departed from the delivery destination at the actual departure time B2, and went to the next delivery destination.

Scheduled and actual analysis apparatus 2 compares each time of the delivery plan with each time of the work record to analyze the cause when delivery is not performed according to the delivery plan. For example, when the work record time B is shorter than the estimated work time A, scheduled and actual analysis apparatus 2 analyzes whether the cause is a delay in movement, a delay in standby, or the like. In order to perform such analysis, it is necessary to accurately specify an actual departure time B from the departure point, the actual arrival time B to the delivery destination, the actual standby time B at the delivery destination, and the work record time B.

[Configuration of Scheduled and Actual Analysis Apparatus 2]

Figure 3:
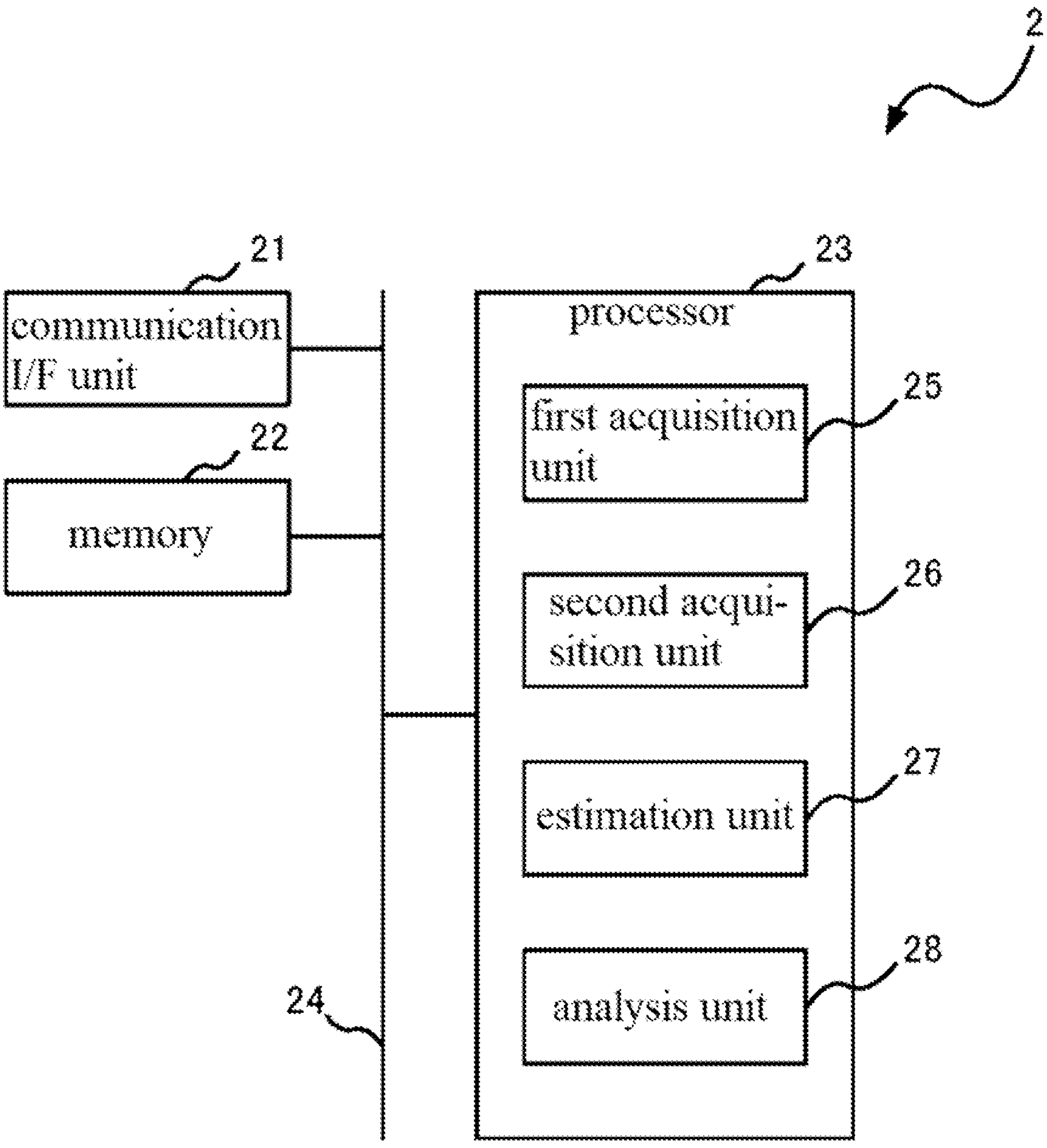
FIG. 3 is a block diagram showing a configuration of a scheduled and actual analysis apparatus.

FIG. 3 is a block diagram showing a configuration of scheduled and actual analysis apparatus 2. Referring to FIG. 3, scheduled and actual analysis apparatus 2 includes a communication I/F (interface) unit 21, a memory 22, and a processor 23 which are connected to each other via a bus 24.

Communication I/F unit 21 includes a communication module for performing wired or wireless communication (data transmission and reception) with an external apparatus such as terminal 3A or vehicle-mounted apparatus 4A.

Memory 22 is configured by a volatile memory element such as a Static Random Access Memory (SRAM) or a Dynamic Random Access Memory (DRAM), a nonvolatile memory element such as a flash memory or an Electrically Erasable Programmable Read Only Memory (EEPROM), or a magnetic storage apparatus such as a hard disk. Memory 22 stores a computer program executed by processor 23. Memory 22 also stores data used during execution of the computer program and data generated during execution of the computer program. For example, memory 22 stores delivery plan information created by the delivery plan creation apparatus.

Processor 23 is configured by a Central Processing Unit (CPU) or the like, and includes a first acquisition unit 25, a second acquisition unit 26, an estimation unit 27, and an analysis unit 28 as functional processing units provided by executing the computer program stored in memory 22.

First acquisition unit 25 acquires the measurement results about the position and the velocity of vehicle 4 from vehicle-mounted apparatus 4A via communication I/F unit 21, and writes the acquired measurement results in memory 22. First acquisition unit 25 may acquire the measurement results each time the position and the velocity of vehicle 4 are measured by vehicle-mounted apparatus 4A, or may collectively acquire a plurality of measurement results.

Second acquisition unit 26 acquires the measurement results about the position and the acceleration of worker 3 from terminal 3A via communication I/F unit 21, and writes the acquired measurement results in memory 22. Second acquisition unit 26 may acquire the measurement results each time the position and the acceleration of worker 3 are measured by terminal 3A, or may collectively acquire a plurality of measurement results.

Based on the measurement result of vehicle-mounted apparatus 4A and the measurement result of terminal 3A, estimation unit 27 estimates a state related to work of worker 3, a state related to traveling of vehicle 4, and a state related to ride of worker 3 in vehicle 4. The process of estimation unit 27 will be described in detail below.

Estimation unit 27 reads the measurement results about the position and the velocity of vehicle 4 and the measurement results about the position and the acceleration of worker 3 within a certain period of time from memory 22.

Here, the certain period of time includes, for example, a delivery time of a package indicated in the delivery plan information.

Figure 4:
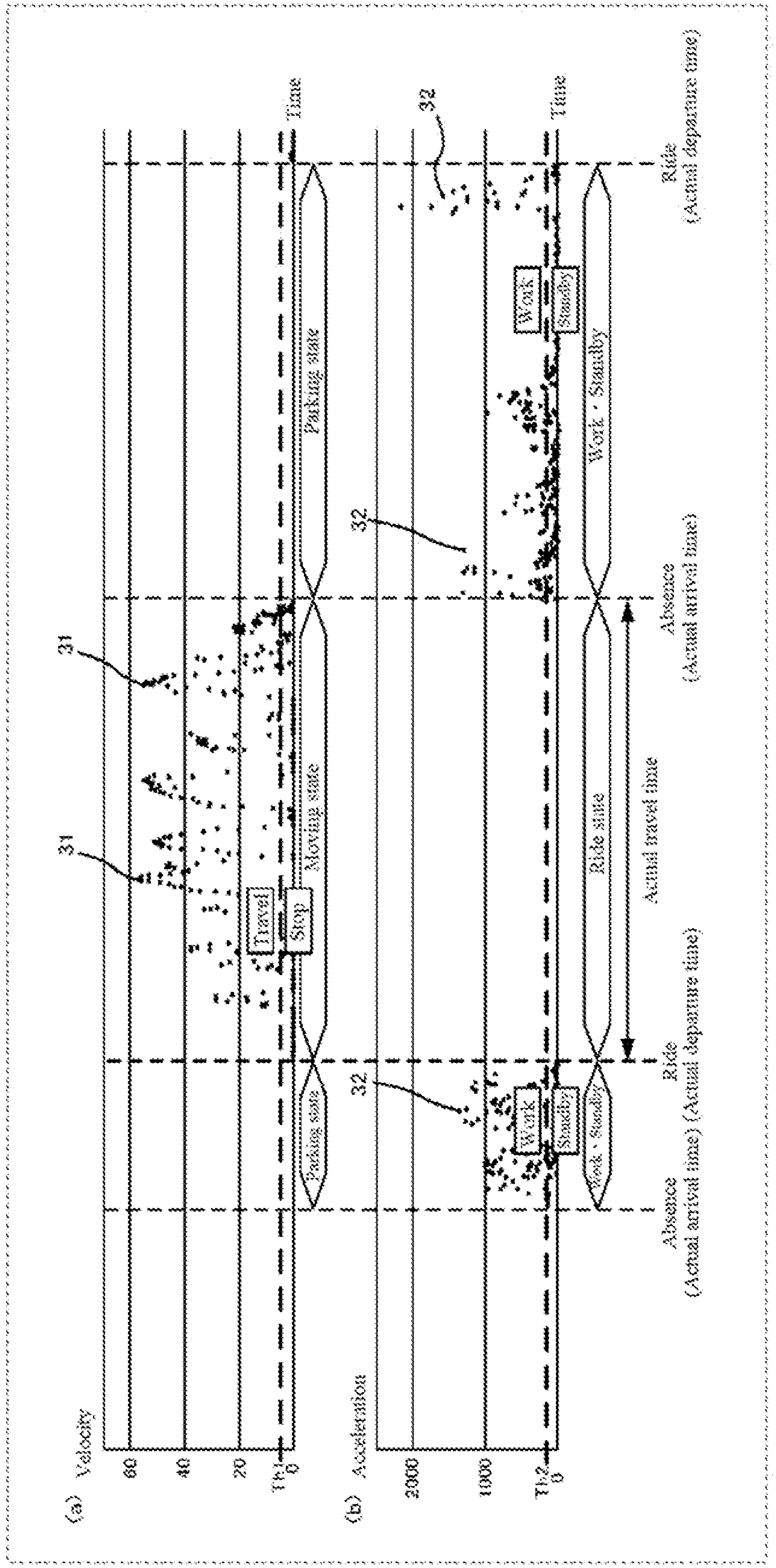
FIG. 4 is a diagram showing an example of a measurement result about a velocity of a vehicle and a measurement result about an acceleration of a worker within a certain period of time.

FIG. 4 is a diagram showing an example of the measurement result about the velocity of vehicle 4 and the measurement result about the acceleration of worker 3 within a certain period of time. FIG. 4 consists of (a) a graph showing the velocity of vehicle 4 and (b) a graph showing the acceleration of worker 3.

The horizontal axis of the graph (a) showing the velocity of vehicle 4 in FIG. 4 represents time and the vertical axis represents the velocity of vehicle 4. Each point 31 indicates the velocity of vehicle 4. The horizontal axis of the graph (b) showing the acceleration of worker 3 in FIG. 4 represents time, and the vertical axis represents the acceleration of worker 3. Each point 32 indicates the acceleration of worker 3. Note that the horizontal axis of the two graphs described above indicates common time.

Although the position information of vehicle 4 and worker 3 is not shown in the graphs of FIG. 4, since the position information is acquired in the same manner as the information of the velocity of vehicle 4 and the acceleration of worker 3, the position information may be displayed in the graphs of FIG. 4.

As shown in the graph (a) of FIG. 4, the measurement result about the velocity of vehicle 4 is continuously obtained at the time when vehicle 4 is moving, and is not continuously obtained at the time when vehicle 4 is parked. This is because vehicle-mounted apparatus 4A is powered off when vehicle 4 is parked, and thus vehicle-mounted apparatus 4A does not perform measurement or transmission of the measurement result.

Estimation unit 27 estimates that vehicle 4 is in a parking state during a time when the measurement result of vehicle-mounted apparatus 4A is not continuously obtained (for example, a time when the measurement result is not obtained for five minutes or more). The parking state of vehicle 4 is a state in which vehicle 4 is parked at a predetermined place and the power supply of vehicle-mounted apparatus 4A is turned off.

Estimation unit 27 estimates that vehicle 4 is in a moving state during a time when the measurement result of vehicle-mounted apparatus 4A is continuously obtained (for example, a time when the measurement result is continuously obtained within five minutes). The moving state of vehicle 4 is a state in which the power supply of vehicle-mounted apparatus 4A is turned on, and in the moving state, vehicle-mounted apparatus 4A performs measurement and transmission of the measurement results.

Estimation unit 27 calculates the time at which the parking state is switched to the moving state as the actual departure time of vehicle 4 and worker 3. In addition, estimation unit 27 calculates the time at which the moving state is switched to the parking state as the actual arrival time of vehicle 4 and worker 3. In addition, estimation unit 27 calculates the time from the actual departure time to the actual arrival time, that is, the time when vehicle 4 is in the moving state, as the actual travel time.

The moving state of vehicle 4 includes a traveling state of vehicle 4 and a stopped state of vehicle 4. Referring to the graph (a) of FIG. 4, estimation unit 27 compares the velocity of vehicle 4 measured by vehicle-mounted apparatus 4A with a predetermined velocity threshold Th1. When the velocity of vehicle 4 is equal to or more than the velocity threshold Th1, estimation unit 27 estimates that vehicle 4 is in the traveling state during the time from when the velocity is obtained to when the next velocity is obtained. When the velocity of vehicle 4 is less than the velocity threshold Th1, estimation unit 27 estimates that vehicle 4 is in the stopped state during the time from when the velocity is obtained to when the next velocity is obtained.

For example, the velocity of vehicle 4 is measured every minute. Estimation unit 27 estimates that vehicle 4 is in the traveling state for one minute from the measurement time of the velocity when the velocity of vehicle 4 is equal to or more than the velocity threshold Th1, and estimates that vehicle 4 is in the stopped state for one minute from the measurement time of the velocity when the velocity is less than the velocity threshold Th1.

Estimation unit 27 estimates, based on the measurement result about the position of vehicle 4 and the measurement result about the position of worker 3, the state related to the ride of worker 3 in vehicle 4. That is, estimation unit 27 estimates, based on these measurement results, a ride state in which worker 3 rides in vehicle 4 and an absence state in which worker 3 is absent in vehicle 4.

Specifically, estimation unit 27 calculates, based on the measurement result about the position of vehicle 4 and the measurement result about the position of worker 3, the distance between vehicle 4 and worker 3. Estimation unit 27 compares the calculated distance with a predetermined distance threshold. When the distance is less than the distance threshold, estimation unit 27 estimates that the state is the ride state in which worker 3 is riding in vehicle 4. In addition, when the distance is equal to or more than the distance threshold, estimation unit 27 estimates that the state is the absence state in which worker 3 is absent in vehicle 4.

In addition, estimation unit 27 performs threshold process on the measurement result about the acceleration of worker 3 to separate the measurement result about the acceleration when worker 3 performs predetermined work and the measurement result about the acceleration when worker 3 is standing by without performing work. Thus, it is estimated whether worker 3 is in the work state or the standby state. Here, the predetermined work is, for example, unloading, loading of the package.

Referring to the graph (b) of FIG. 4, when the absolute acceleration of worker 3 is equal to or more than an acceleration threshold Th2, estimation unit 27 estimates that worker 3 is in the work state during the time from when the acceleration is obtained to when the next acceleration is obtained. When the absolute acceleration of worker 3 is less than the acceleration threshold Th2, estimation unit 27 estimates that worker 3 is in the standby state during the time from when the acceleration is obtained to when the next acceleration is obtained.

For example, the acceleration of worker 3 is measured every minute. Estimation unit 27 estimates that worker 3 is in the work state for one minute from the measurement time of the acceleration when the absolute acceleration of worker 3 is equal to or more than the acceleration threshold Th2, and estimates that worker 3 is in the standby state for one minute from the measurement time of the acceleration when the absolute acceleration is less than the acceleration threshold Th2.

It is desirable that estimation unit 27 estimates whether worker 3 is in the work state or the standby state by using the measurement result about the acceleration of worker 3 when worker 3 is in the absence state without using the measurement result about the acceleration of worker 3 when worker 3 is in the ride state. This is because when worker 3 is in the ride state, worker 3 does not perform the predetermined work.

In the time zone in which worker 3 is in the absence state, estimation unit 27 calculates the sum of the times in which worker 3 is in the work state as the work record time and calculates the sum of the times in which worker 3 is in the standby state as the actual standby time. When the time zones of the work record time and the actual standby time can be clearly separated as shown in FIG. 2, estimation unit 27 estimates the boundary time of the time zones as the actual standby end time (actual work start time).

Referring to FIG. 3 again, analysis unit 28 detects a temporal difference between the delivery plan and the work record based on the delivery plan information stored in memory 22 and the result information of the work state of worker 3 estimated by estimation unit 27, and analyzes the cause of the temporal difference based on the detection result. Analysis unit 28 transmits the analysis result to the delivery plan creation apparatus via communication I/F unit 21.

Processing Procedure of Scheduled and Actual Analysis Apparatus 2

Figure 5:
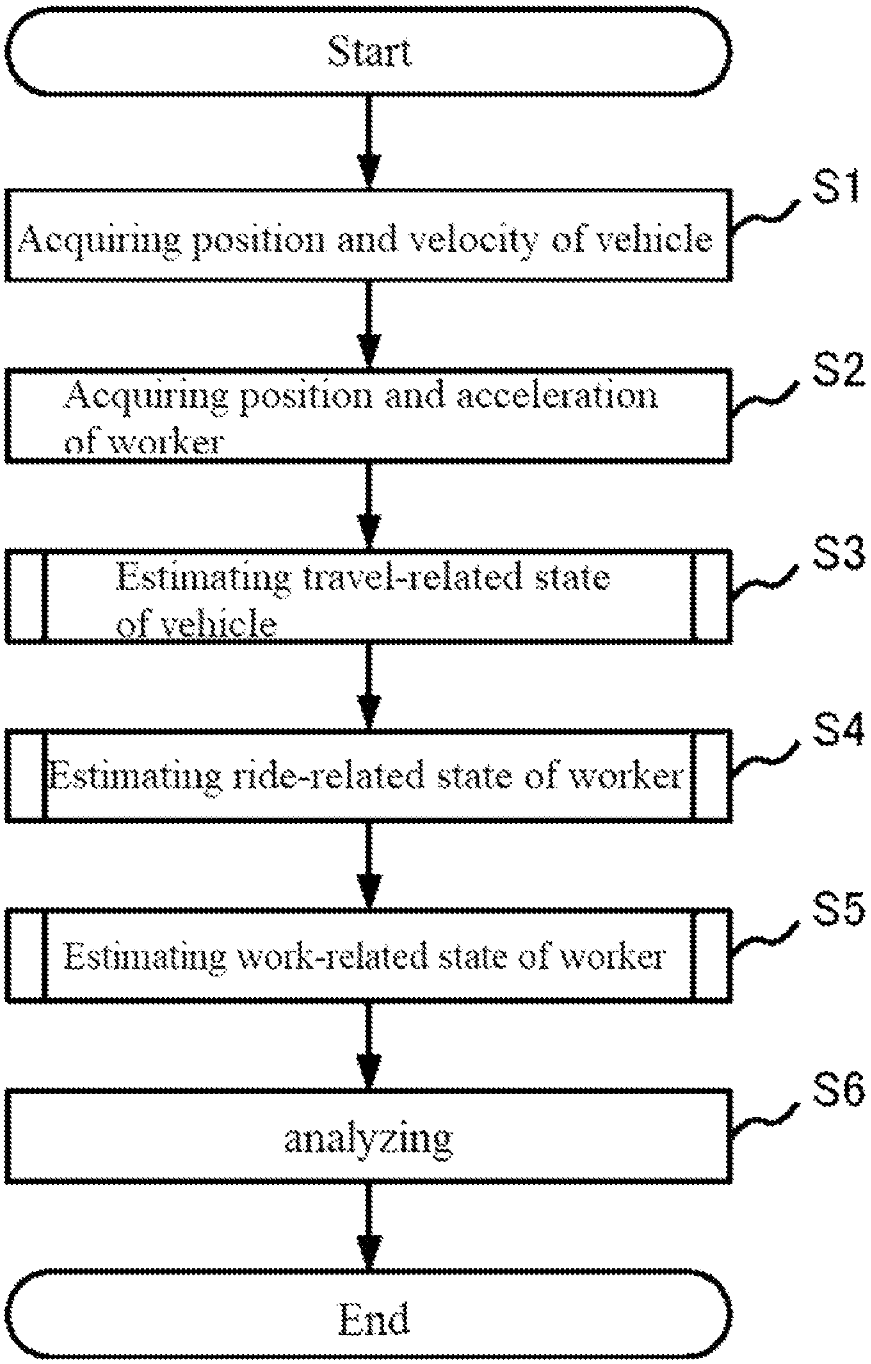
FIG. 5 is a flowchart showing a procedure of process executed by a scheduled and actual analysis apparatus.

FIG. 5 is a flowchart showing a procedure of process executed by scheduled and actual analysis apparatus 2. It is assumed that prior to the process shown in FIG. 5, first acquisition unit 25 acquires from vehicle-mounted apparatus 4A the measurement results about the position and the velocity of vehicle 4 at times including the delivery time of the package indicated in the delivery plan information and writes the measurement results in memory 22. In addition, it is assumed that second acquisition unit 26 acquires from terminal 3A the measurement results about the position and the acceleration of worker 3 at times including the delivery time of the package indicated in the delivery plan information and writes the measurement results in memory 22.

Referring to FIG. 5, estimation unit 27 reads from memory 22 the measurement results about the position and the velocity of vehicle 4 at times including the delivery time of the package indicated in the delivery plan information (for example, the delivery time and one hour before and after the delivery time) (step S1).

Estimation unit 27 reads from memory 22 the measurement results about the position and the acceleration of worker 3 at times including the delivery time of the package indicated in the delivery plan information (step S2).

Estimation unit 27 estimates a travel-related state which is a state related to traveling of vehicle 4 based on the measurement result about the velocity of vehicle 4 read from memory 22 (step S3).

Figure 6:
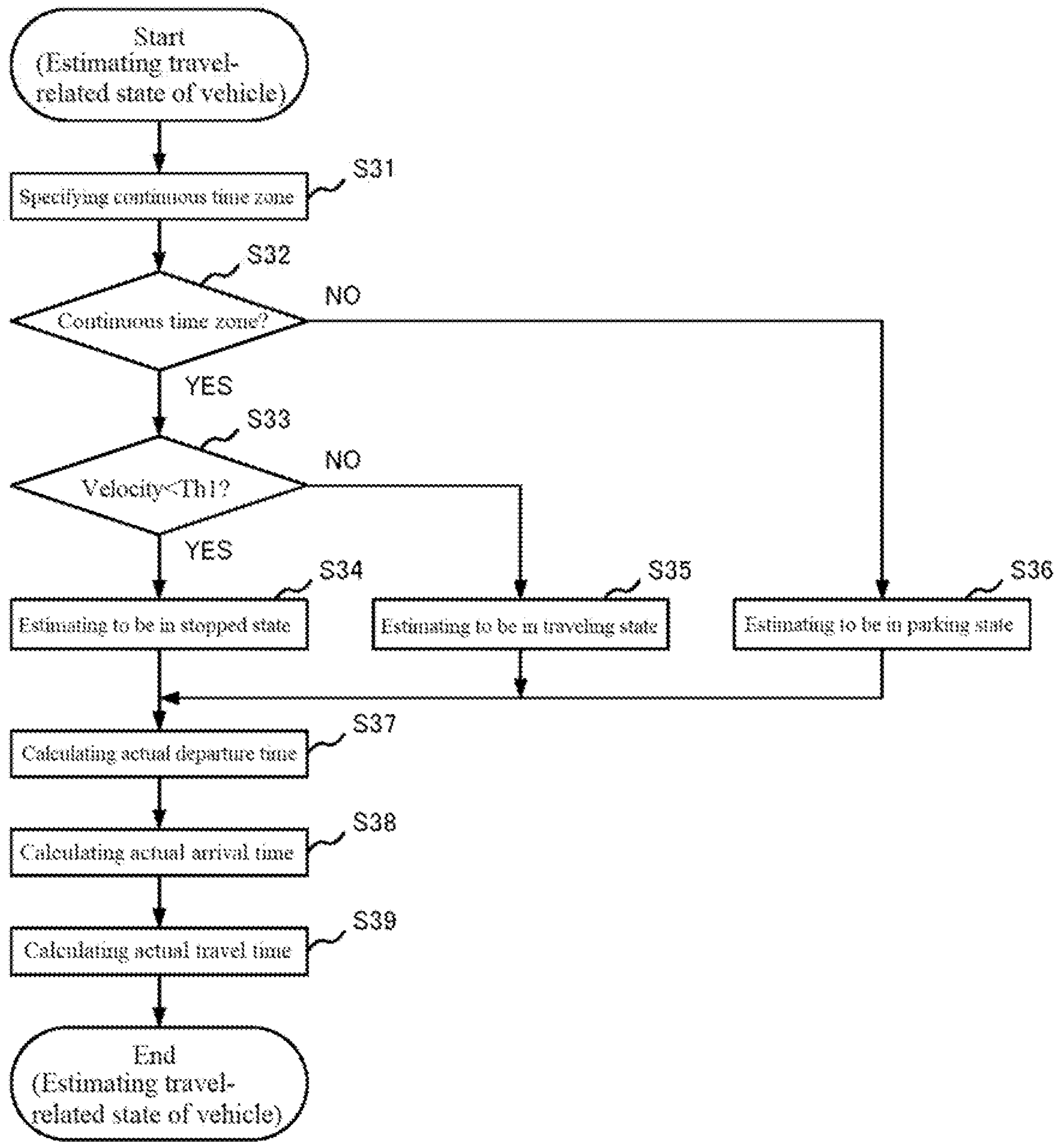
FIG. 6 is a flowchart showing the details of a travel-related state estimation process (step S3 in FIG. 5) of a vehicle.

FIG. 6 is a flowchart showing the details of the travel-related state estimation process (step S3 in FIG. 5) of vehicle 4. Referring to the graph (a) of FIG. 4 and FIG. 6, estimation unit 27 specifies a time zone in which the velocity of vehicle 4 is continuously obtained (for example, a time zone in which the velocity is continuously obtained for 5 minutes or more) (step S31).

For each measurement result about the velocity of vehicle 4 included in the specified time zone (YES in step S32), estimation unit 27 determines whether or not the velocity is less than the velocity threshold Th1 (step S33).

When the velocity is less than the velocity threshold Th1 (YES in step S33), estimation unit 27 estimates that vehicle 4 is in the stopped state during the time from when the velocity is obtained to when the next velocity is obtained (step S34).

When the velocity is equal to or more than the velocity threshold Th1 (NO in step S33), estimation unit 27 estimates that vehicle 4 is in the traveling state during the time from when the velocity is obtained to when the next velocity is obtained (step S35).

In a time zone other than the time zone specified in step S31 (NO in step S32), estimation unit 27 estimates that vehicle 4 is in the parking state (step S36).

Estimation unit 27 calculates the time when vehicle 4 is switched from the parking state to the moving state as the actual departure time of vehicle 4 and worker 3 (step S37).

Estimation unit 27 calculates the time when vehicle 4 is switched from the moving state to the parking state as the actual arrival time of vehicle 4 and worker 3 (step S38).

Estimation unit 27 calculates the time from the actual departure time to the actual arrival time as the actual travel time of vehicle 4 and worker 3 (step S39).

Referring back to FIG. 5, estimation unit 27 estimates a ride-related state which is a state related to the ride of worker 3 in vehicle 4 (step S4).

Figure 7:
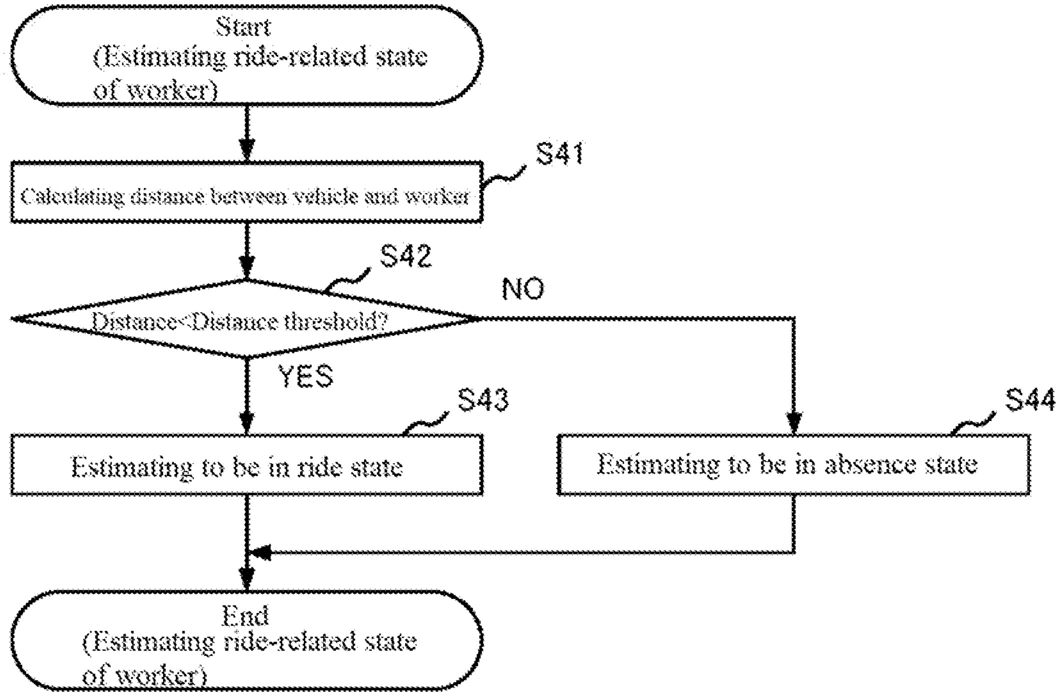
FIG. 7 is a flowchart showing the details of a ride-related state estimation process (step S4 in FIG. 5) of a worker.

FIG. 7 is a flowchart showing the details of a ride-related state estimation process (step S4 in FIG. 5) of worker 3. Referring to FIG. 7, estimation unit 27 calculates the distance between vehicle 4 and worker 3 for each measurement time at which the measurement result about the position of vehicle 4 and the measurement result about the position of worker 3 stored in memory 22 are obtained (step S41). When both measurement times are included in a predetermined time range, they may be regarded as the same measurement time. Estimation unit 27 compares each of the calculated distances with a predetermined distance threshold (step S42).

When the calculated distance is less than the distance threshold (YES in step S42), estimation unit 27 estimates that worker 3 is in the ride state in which worker 3 is riding in vehicle 4 at the measurement time of the measurement result from which the distance is calculated (step S43).

When the calculated distance is equal to or more than the distance threshold (NO in step S42), estimation unit 27 estimates that worker 3 is in the absence state in which worker 3 is absent in vehicle 4 at the measurement time of the measurement result from which the distance is calculated (step S44).

Referring back to FIG. 5, estimation unit 27 estimates a work-related state which is a state related to work of worker 3 based on the measurement result about the acceleration of worker 3 read from memory 22 (step S5).

Figure 8:
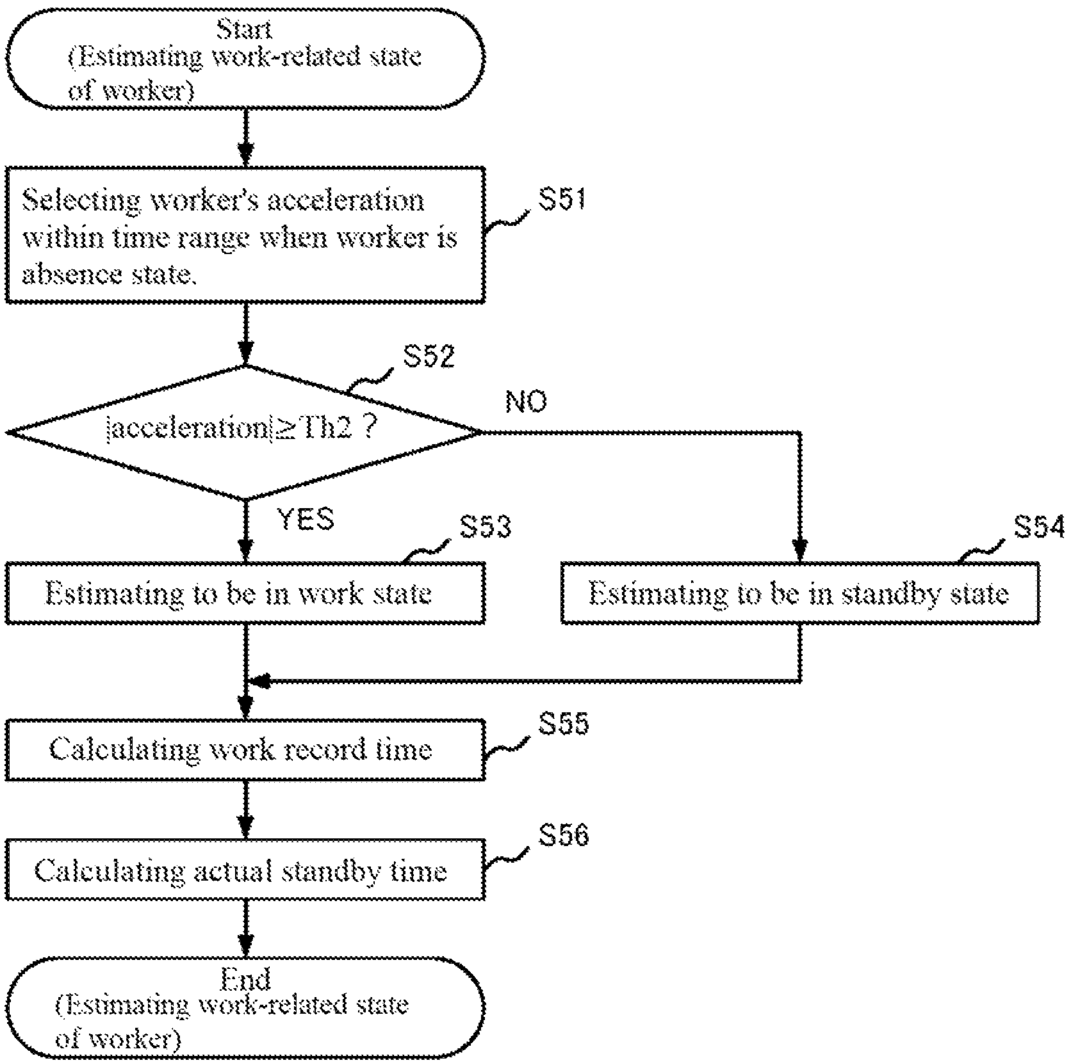
FIG. 8 is a flowchart showing the details of a work-related state estimation process (step S5 in FIG. 5) of a worker.

FIG. 8 is a flowchart showing the details of work-related state estimation process (step S5 in FIG. 5) of worker 3. Referring to FIG. 8 and the graph of FIG. 4 (b), the measurement result about the acceleration of worker 3 in the time range in which worker 3 is in the absence state is selected (step S51).

For each selected acceleration, estimation unit 27 compares the absolute acceleration with the acceleration threshold Th2 (step S52).

When the absolute acceleration of worker 3 is equal to or more than the acceleration threshold Th2 (YES in step S52), estimation unit 27 estimates that worker 3 is in the work state during the time from when the acceleration is obtained to when the next acceleration is obtained (step S53).

When the absolute acceleration value of worker 3 is less than the acceleration threshold Th2 (NO in step S52), estimation unit 27 estimates that worker 3 is in the standby state during the time from when the acceleration is obtained to when the next acceleration is obtained (step S54).

Estimation unit 27 calculates the sum of times during which worker 3 is in the work state as the work record time (step S55).

Estimation unit 27 calculates the sum of times during which worker 3 is in the standby state as the actual standby time (step S56).

Referring to FIG. 5 again, analysis unit 28 detects a temporal difference between the delivery plan and the work record based on the delivery plan information stored in memory 22 and the result information on the work estimated in steps S3 to S5, and analyzes the cause of the temporal difference based on the detection result (step S6). Analysis unit 28 transmits the analysis result to the delivery plan creation apparatus via communication I/F unit 21.

Effects, etc. of Embodiment 1

As described above, according to the embodiment 1 of the present disclosure, the state related to the work of worker 3 can be estimated based on the measurement result about the state of vehicle 4 and the measurement result about the state of worker 3. Here, the measurement result about the state of vehicle 4 and the measurement result about the state of worker 3 can be automatically acquired from vehicle-mounted apparatus 4A and terminal 3A, respectively. Therefore, it is possible to accurately estimate the state related to the work of worker 3 without imposing a burden of information input on the user.

In addition, when the distance between vehicle 4 and worker 3 is less than the distance threshold, it can be estimated that worker 3 is riding in vehicle 4, and when the distance is equal to or more than the distance threshold, it can be estimated that worker 3 is absent in vehicle 4. Thus, the time when it is determined that worker 3 is riding in vehicle 4 can be excluded from the work time of worker 3.

In addition, by performing threshold process on the measurement result about the acceleration of worker 3, it is possible to separate the measurement result when worker 3 is working from the measurement result when worker 3 is standing by. Thus, the state of work or standby of worker 3 can be accurately estimated.

Further, estimation unit 27 estimates the state of work or standby of worker 3 in the time range in which worker 3 is estimated to be absent in vehicle 4. Therefore, the time range for estimating the state of work or standby of worker 3 can be limited, and thus the state of work or standby of worker 3 can be accurately estimated.

Further, by performing the threshold process on the measurement result about the velocity of vehicle 4, it is possible to separate the measurement result when vehicle 4 is traveling from the measurement result when vehicle 4 is stopped. Accordingly, it is possible to accurately estimate the state in which vehicle 4 in which worker 3 is riding is traveling and the state in which vehicle 4 is stopped.

Embodiment 2

In the embodiment 1, estimation unit 27 estimates, based on the distance between worker 3 and vehicle 4, whether worker 3 is riding in vehicle 4 or absent in vehicle 4. In the embodiment 2, an example will be described in which estimation unit 27 estimates, based on a change in the distance between vehicle 4 and worker 3, the state of the ride of worker 3 in vehicle 4.

The configuration of scheduled and actual management system 1 is similar to the configuration of the embodiment 1. Hereinafter, differences from the embodiment 1 will be mainly described.

Figure 9:
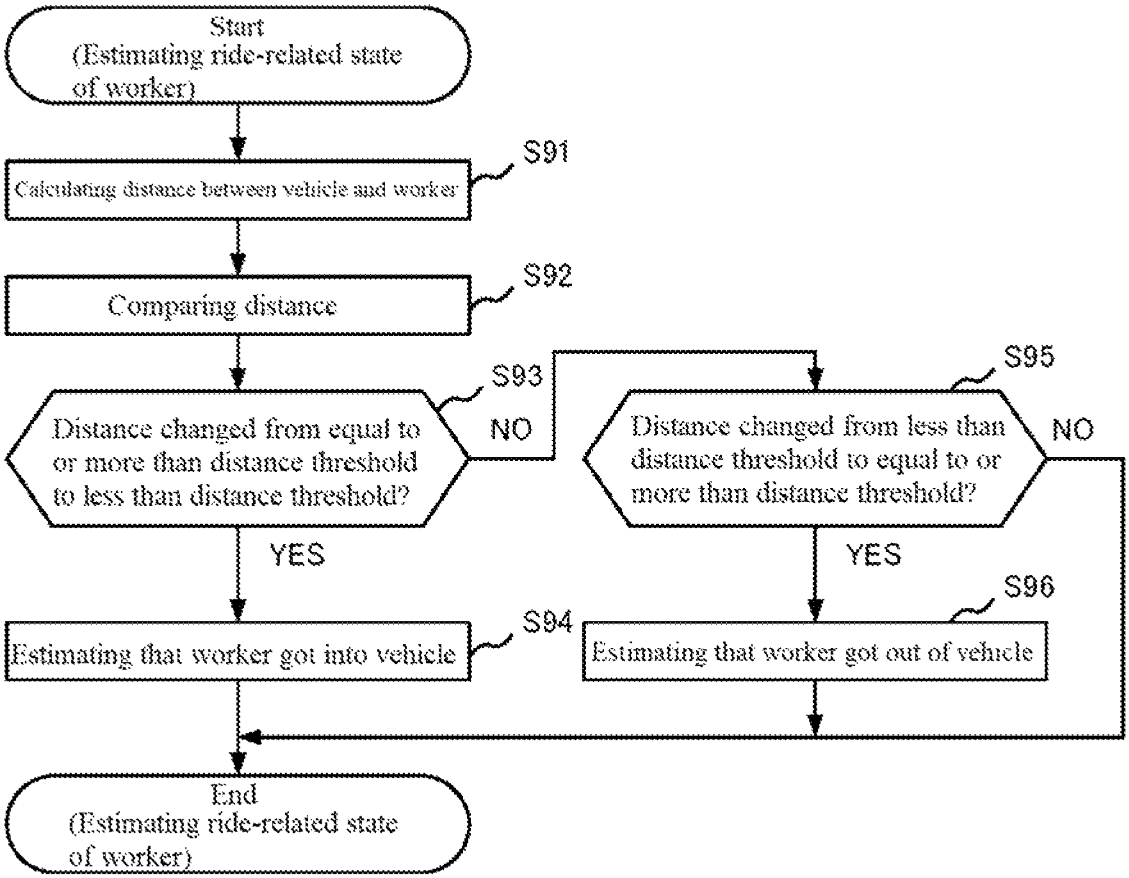
FIG. 9 is a flowchart showing the details of a ride-related state estimation process (step S4 in FIG. 5) of a worker according to an embodiment 2 of the present disclosure.

FIG. 9 is a flowchart showing the details of the ride-related state estimation process (step S4 in FIG. 5) of worker 3 according to embodiment 2 of the present disclosure.

Referring to FIG. 9, estimation unit 27 calculates the distance between vehicle 4 and worker 3 for each measurement time at which the measurement result about the position of vehicle 4 and the measurement result about the position of worker 3 are obtained (step S91). When both measurement times are included in a predetermined time range, they may be regarded as the same measurement time. Estimation unit 27 compares the calculated distances in consecutive measurement times (step S92).

When the calculated distance changed from equal to or more than the predetermined distance threshold to less than the distance threshold (YES in step S93), estimation unit 27 estimates that worker 3 got into vehicle 4 at the time when the distance changed (step S94).

When the calculated distance changed from less than the distance threshold to equal to or more than the distance threshold (NO in step S93 and YES in step S95), estimation unit 27 estimates that worker 3 got out of vehicle 4 at the time when the distance changed (step S96).

In steps S94 and S96, the time when the distance changed may be the earlier or later measurement time of the two calculated distance measurement times. Alternatively, it may be the time (for example, an average time) calculated from two measurement times.

As described above, according to the embodiment 2 of the present disclosure, estimation unit 27 can estimate that worker 3 got into vehicle 4 when the distance between vehicle 4 and worker 3 changed from equal to or more than the distance threshold to less than the distance threshold, and can estimate that worker 3 got out of vehicle 4 when the distance changed from less than the distance threshold to equal to or more than the distance threshold. Thus, estimation unit 27 can accurately estimate getting worker 3 into vehicle 4 and getting worker 3 out of vehicle 4.

Embodiment 3

In the embodiment 1, estimation unit 27 estimates whether worker 3 is riding on vehicle 4 or absent in vehicle 4 based on the distance between worker 3 and vehicle 4. In the embodiment 3, an example will be described in which estimation unit 27 estimates, based on the connection state of wireless communication between terminal 3A and vehicle-mounted apparatus 4A, the state of the ride of worker 3 in vehicle 4.

Figure 10:
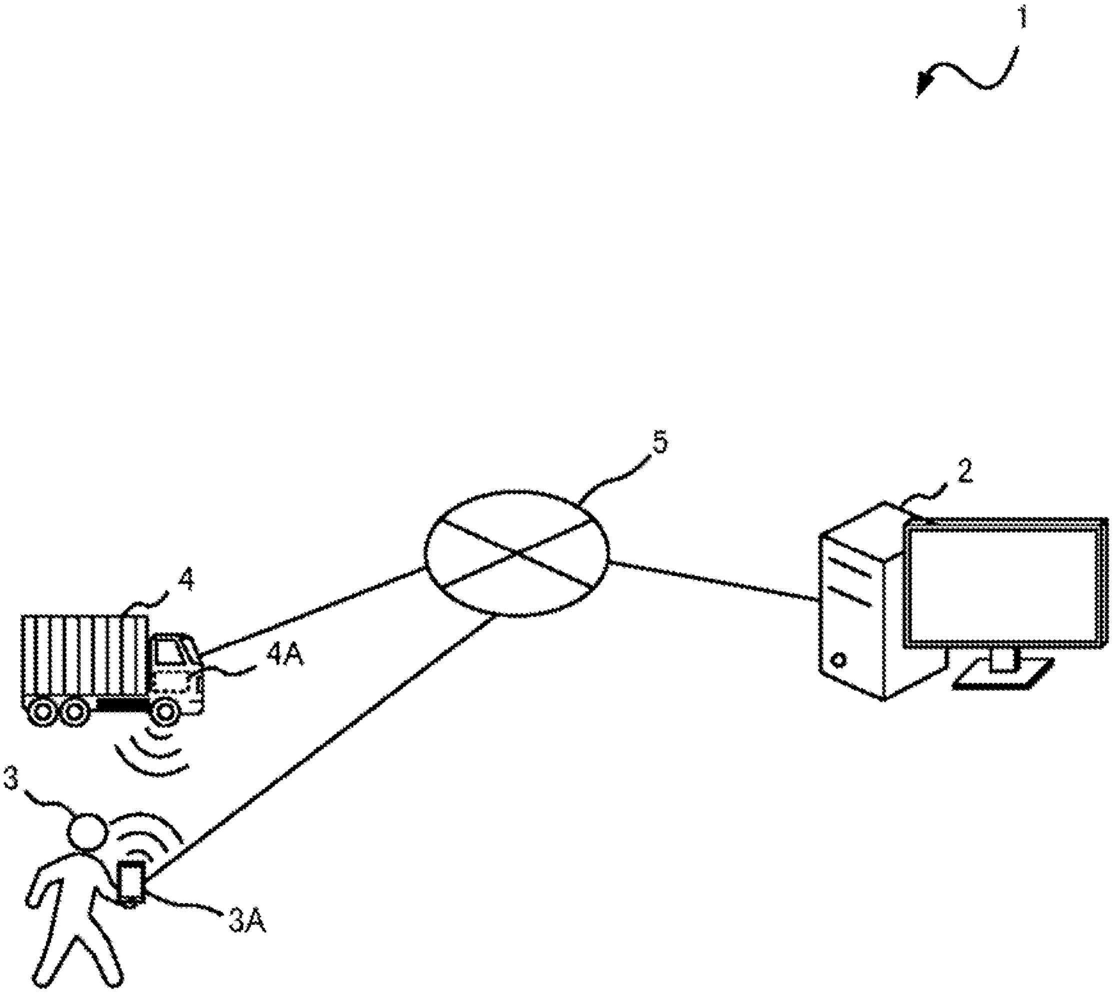
FIG. 10 is a diagram showing an overall configuration of a scheduled and actual management system according to an embodiment 3 of the present disclosure.

FIG. 10 is a diagram showing an overall configuration of a scheduled and actual management system according to the embodiment 3 of the present disclosure. Referring to FIG. 10, scheduled and actual management system 1 has the similar configuration to scheduled and actual management system 1 according to the embodiment 1 shown in FIG. 1. However, terminal 3A and vehicle-mounted apparatus 4A can transmit and receive data to and from each other through near field communication without using network 5. Terminal 3A and vehicle-mounted apparatus 4A are connected by a communication method compliant with a communication protocol such as Bluetooth (registered trademark), ZigBee (registered trademark), or Wibree.

Terminal 3A periodically transmits connection state information indicating a connection state with vehicle-mounted apparatus 4A by the near field communication to scheduled and actual analysis apparatus 2 via network 5. However, vehicle-mounted apparatus 4A may transmit the connection state information to scheduled and actual analysis apparatus 2.

Figure 11:
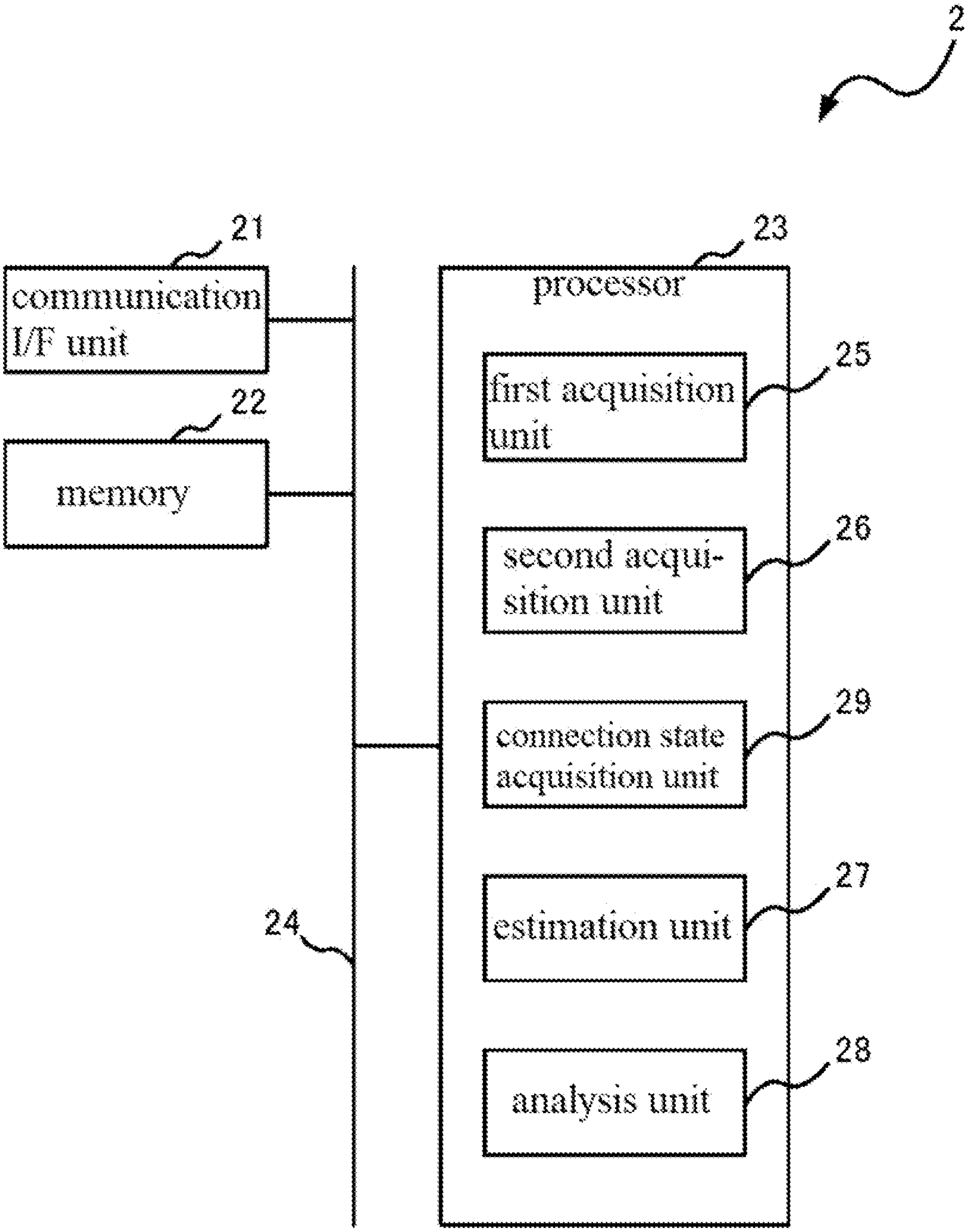
FIG. 11 is a block diagram showing a configuration of a scheduled and actual analysis apparatus.

FIG. 11 is a block diagram showing a configuration of scheduled and actual analysis apparatus 2. Referring to FIG. 11, scheduled and actual analysis apparatus 2 has similar configuration to scheduled and actual analysis apparatus 2 according to the embodiment 1 shown in FIG. 3. However, processor 23 further includes a connection state acquisition unit 29 as a functional processing unit provided by executing the computer program stored in memory 22.

Connection state acquisition unit 29 acquires connection state information from terminal 3A via communication I/F unit 21, and writes the connection state information in memory 22 in association with the measurement time of the connection state. Connection state acquisition unit 29 may write the connection state information and the acquisition time of the connection state information in memory 22 in association with each other.

Estimation unit 27 estimates, based on the connection state information acquired by connection state acquisition unit 29, a state of a ride of worker 3 in vehicle 4 or absence of worker 3 from vehicle 4.

Figure 12:
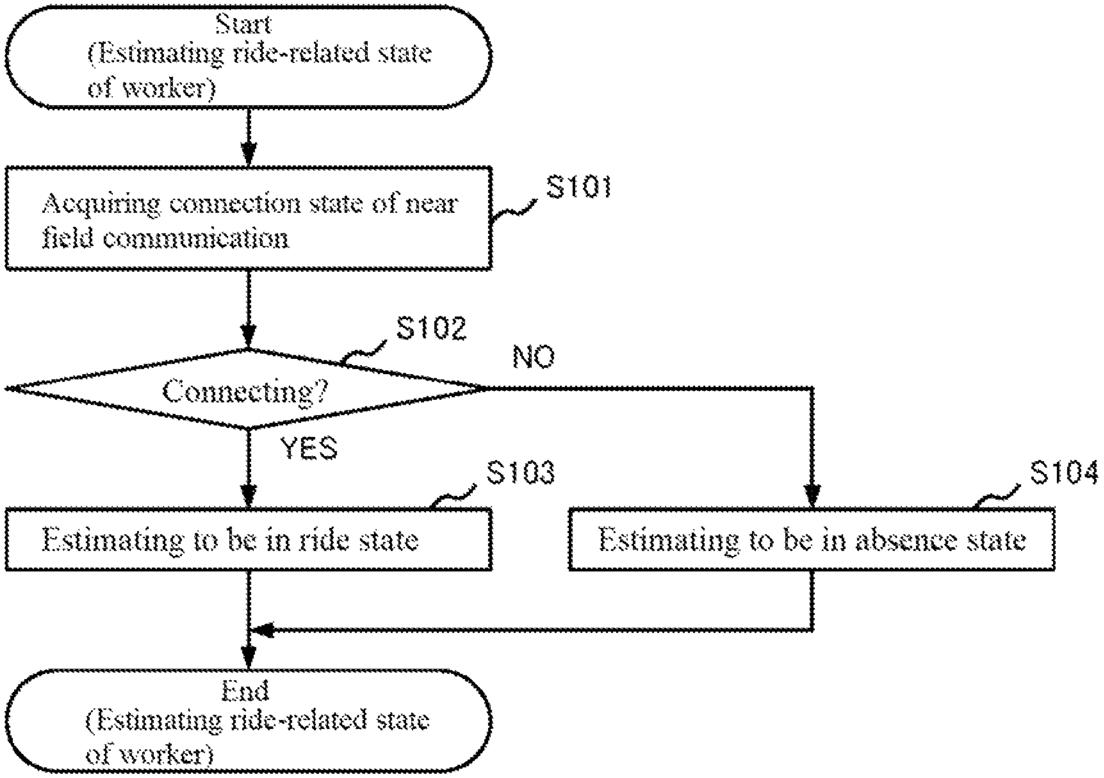
FIG. 12 is a flowchart showing the details of a ride-related state estimation process (step S4 in FIG. 5) of a worker according to embodiment 3 of the present disclosure.

FIG. 12 is a flowchart showing the details of the ride-related state estimation process (step S4 in FIG. 5) of worker 3 according to the embodiment 3 of the present disclosure.

Referring to FIG. 12, estimation unit 27 reads the connection state information for each measurement time of the connection state of the near field communication of terminal 3A and vehicle-mounted apparatus 4A from memory 22 (step S101).

Estimation unit 27 executes the processing of steps S102 to S104 for each measurement time based on the read connection state information.

That is, when the connection state information indicates that terminal 3A and vehicle-mounted apparatus 4A are connected by the near field communication (YES in step S102), estimation unit 27 estimates that worker 3 is in the ride state in which worker 3 is riding in vehicle 4 at the measurement time of the connection state (step S103).

When the connection state information indicates that terminal 3A and vehicle-mounted apparatus 4A are not connected by the near field communication (NO in step S102), estimation unit 27 estimates that worker 3 is in the absence state in which worker 3 is absent in vehicle 4 at the measurement time of the connection state (step S104).

When the connection state information is stored in memory 22 in association with the acquired time, the processing of steps S102 to S104 is executed for each acquired time.

As described above, according to the embodiment 3 of the present disclosure, when terminal 3A and vehicle-mounted apparatus 4A are connected by the near field communication, it can be estimated that worker 3 is riding in vehicle 4, and when the near field communication between terminal 3A and vehicle-mounted apparatus 4A is disconnected, it can be estimated that worker 3 is absent in vehicle 4.

Modification

In the embodiments 1 to 3 described above, terminal 3A includes the acceleration sensor that measures the acceleration of terminal 3A. However, instead of the acceleration sensor, terminal 3A may include an altitude sensor that measures an altitude of terminal 3A, a velocity sensor that measures a velocity of terminal 3A, or an angular velocity sensor that measures an angular velocity of terminal 3A.

For example, when the altitude of terminal 3A (i.e., an altitude of worker 3 carrying terminal 3A) is equal to or more than a predetermined altitude threshold, estimation unit 27 of scheduled and actual analysis apparatus 2 estimates that worker 3 is in the work state during the time from when the altitude is obtained to when the next altitude is obtained. When the altitude of worker 3 is less than the altitude threshold value, estimation unit 27 estimates that worker 3 is in the standby state during the time from when the altitude is obtained to when the next altitude is obtained. When worker 3 performs work at a high place and performs standby at a low place, the work state and the standby state of worker 3 can be accurately estimated by such an estimation method.

When the velocity of terminal 3A (i.e., a velocity of worker 3 carrying terminal 3A) is equal to or more than a predetermined velocity threshold, estimation unit 27 estimates that worker 3 is in the work state during the time from when the velocity is obtained to when the next velocity is obtained. When the velocity of worker 3 is less than the velocity threshold, estimation unit 27 estimates that worker 3 is in the standby state during the time from when the velocity is obtained to when the next velocity is obtained.

When the absolute angular velocity of terminal 3A (i.e., an angular velocity of worker 3 carrying terminal 3A) is equal to or more than a predetermined velocity threshold, estimation unit 27 estimates that worker 3 is in the work state during the time from when the angular velocity is obtained to when the next angular velocity is obtained. When the absolute value of the angular velocity of worker 3 is less than the angular velocity threshold, estimation unit 27 estimates that worker 3 is in the standby state during the time from when the angular velocity is obtained to when the next angular velocity is obtained.

In addition, estimation unit 27 may estimate, based on the measurement result about at least one of the velocity, the acceleration, the angular velocity, and the altitude of worker 3 by at least one of the velocity sensor, the acceleration sensor, the angular velocity sensor, and the altitude sensor, the state of work or standby of worker 3.

Further, estimation unit 27 may estimate the work state and the standby state of worker 3 in more detail using a plurality of measurement results measured by the plurality of sensors. For example, it is assumed that the work-related state of worker 3 includes, in addition to the work state and the standby state, a work temporary stopped state which is a state in which work is temporarily stopped but can be immediately returned to work. It is assumed that estimation unit 27 estimates, by using the measurement results of the altitude sensor and the acceleration sensor, the work-related state. It is also assumed that it is known that worker 3 performs work at a high place but does not perform work at a low place. In this case, estimation unit 27 estimates that worker 3 is in the work state when the altitude of terminal 3A is equal to or more than the predetermined altitude thresholds and the acceleration of terminal 3A is equal to or more than the predetermined acceleration thresholds. In addition, estimation unit 27 estimates that worker 3 is in the work temporary stopped state when the altitude of terminal 3A is equal to or more than the predetermined altitude and the acceleration of terminal 3A is less than the predetermined acceleration threshold. This is because it is considered that worker 3 does not standby at a high place and temporarily stops work. Further, estimation unit 27 estimates that worker 3 is in the standby state regardless of the acceleration of terminal 3A if the altitude of terminal 3A is less than the predetermined altitude. This is because it is known that worker 3 does not work at the low position.

[Supplementary Notes]

Some or all of the constituent elements constituting each of the above-described apparatuses may be constituted by a semiconductor apparatus such as one or more system Large Scale Integrations (LSI).

In addition, some or all of the functions of each of the apparatuses may be provided by cloud computing. That is, some or all of the functions of each apparatus may be implemented by the cloud server. In addition, at least a part of the above embodiments may be arbitrarily combined.

Each process (each function) of the above-described embodiments is implemented by a processing circuit (Circuitry) including one or more processors. The processing circuit may be configured by an integrated circuit or the like in which one or more memories, various analog circuits, and various digital circuits are combined in addition to the one or more processors. The one or more memories store computer programs (instructions) that cause the one or more processors to execute the processes described above. The one or more processors may execute the processes in accordance with the computer program read from the one or more memories, or may execute the processes in accordance with a logic circuit designed in advance to execute the processes. The processor may be various processors suitable for control of a computer, such as a CPU, a Graphics Processing Unit (GPU), a Digital Signal Processor (DSP), a Field Programmable Gate Array (FPGA), and an Application Specific Integrated Circuit (ASIC). Note that the plurality of processors physically separated from each other may cooperate with each other to execute the processes. For example, the processor mounted on each of a plurality of physically separated computers may cooperate with each other via a network such as a Local Area Network (LAN), a Wide Area Network (WAN), or the Internet to execute the processes. The program may be installed in the memory from an external server apparatus or the like via the network, or may be distributed in a state of being stored in a recording medium such as a Compact Disc-Read Only Memory (CD-ROM), a Digital Versatile Disk Read Only Memory (DVD-ROM), or a semiconductor flash memory, and may be installed in the memory from the recording medium.

It goes without saying that the computer program as described above can be distributed via a computer-readable non-transitory recording medium such as a CD-ROM or a communication network such as the Internet. The present disclosure can also be implemented as a semiconductor integrated circuit that implements part or all of the work-related state estimation apparatus.

The embodiments disclosed herein are to be considered in all respects as illustrative and not restrictive. The scope of the present disclosure is defined not by the above meaning but by the claims, and is intended to include all modifications within the meaning and scope equivalent to the claims.

REFERENCE SIGNS LIST

1 scheduled and actual management system (work-related state estimation system)
2 scheduled and actual analysis apparatus (work-related state estimation apparatus)
3 worker
3A terminal
4 vehicle
4A vehicle-mounted apparatus
5 network
21 communication I/F unit
22 memory
23 processor
24 bus
25 first acquisition unit
26 second acquisition unit
27 estimation unit
28 analysis unit
29 connection state acquisition unit

The invention claimed is:

1. A state estimation apparatus comprising:

a first acquisition circuit configured to acquire a measurement result of a first sensor, the first sensor being a sensor mounted in a vehicle in which a worker is to ride and being configured to measure a state of the vehicle;

a second acquisition circuit configured to acquire a measurement result of a second sensor, the second sensor being a sensor carried by the worker and being configured to measure a state of the worker; and an estimation circuit configured to estimate, based on the measurement result of the first sensor and the measurement result of the second sensor, a state related to work of the worker, wherein;

the measurement result of the first sensor is a position of the vehicle and a velocity of the vehicle;

the measurement result of the second sensor is a position of the worker;

the estimation circuit is configured to estimate, based on a change in a distance between the vehicle and the worker, a state related to a ride of the worker in the vehicle, and the estimation circuit is configured to estimate, based on a measurement result about the velocity of the vehicle, a state of movement of the worker by the vehicle.

2. The state estimation apparatus according to claim 1, wherein when the estimated distance between the vehicle and the worker changes from equal to or more than a distance threshold to less than the distance threshold, the estimation circuit estimates that the worker gets into the vehicle at the time when the distance changes, and when the estimated distance changes from less than the distance threshold to equal to or more than the distance threshold, the estimation circuit estimates that the worker gets out of vehicle at a time when the distance changes.

3. A state estimation method comprising:

acquiring, by a state estimation apparatus, a measurement result of a first sensor, the first sensor being a sensor mounted in a vehicle in which a worker is to ride and being configured to measure a state of the vehicle;

acquiring, by the state estimation apparatus, a measurement result of a second sensor, the second sensor being a sensor carried by the worker and being configured to measure a state of the worker; and estimating, by the state estimation apparatus, based on the measurement result of the first sensor and the measurement result of the second sensor, a state related to work of the worker, wherein the measurement result of the first sensor is a velocity of the vehicle, and the method comprises estimating, based on a measurement result about the velocity of the vehicle, a state of movement of the worker by the vehicle.

4. The state estimation method according to claim 3, wherein the measurement result of the first sensor is a position of the vehicle, the measurement result of the second sensor is a position of the worker, and the method comprises estimating a state related to a ride of the worker in the vehicle.

5. The state estimation ratus-method according to claim 4, wherein the method comprises estimating, based on a change in a distance between the vehicle and the worker, the state of a ride of the worker in the vehicle.

6. The state estimation method according to claim 5, wherein the measurement result of the second sensor is at least one of a velocity, an acceleration, an angular velocity, or an altitude of the worker, and the method comprises estimating, based on a measurement result about at least one of the velocity, the acceleration, the angular velocity, or the altitude of the worker, a state of work or standby of the worker.

7. The state estimation method according to claim 5, comprising:

analyzing by an analysis circuit and based on the estimated state related to work of the worker and a delivery plan of the vehicle, a relationship between the delivery plan and a delivery record; and outputting an analysis result.

8. The state estimation method according to claim 5, wherein the method comprises when the estimated distance between the vehicle and the worker changes from equal to or more than a distance threshold to less than the distance threshold, estimating that the worker gets into the vehicle at a time when the distance changes, and when the estimated distance changes from less than the distance threshold to equal to or more than the distance threshold, estimating that the worker gets out of vehicle at the time when the distance changes.

9. The state estimation method according to claim 4, wherein the measurement result of the second sensor is at least one of a velocity, an acceleration, an angular velocity, or an altitude of the worker, and the method comprises estimating, based on a measurement result about at least one of the velocity, the acceleration, the angular velocity, or the altitude of the worker, a state of work or standby of the worker.

10. The state estimation method according to claim 9, wherein the method comprises estimating the state of work or standby of the worker within a time range in which the worker is estimated to be absent in the vehicle.

11. The state estimation method according to claim 9, wherein the measurement result of the second sensor includes the acceleration and the altitude of the worker, and the method comprises estimating the state of work or standby of the worker based on a combination of (i) a comparison result between the acceleration of the worker and an acceleration threshold value and (ii) a comparison result between the altitude of the worker and an altitude threshold value.

12. The state estimation method according to claim 4, further comprising analyzing, by an analysis circuit and based on the estimated state related to work of the worker and a delivery plan of the vehicle, a relationship between the delivery plan and a delivery record; and outputting an analysis result.

13. The state estimation method according to claim 3, further comprising:

acquiring, by a connection state acquisition circuit, a connection state in wireless communication between a communication device mounted in the vehicle and a communication device carried by the worker, wherein the method comprises estimating, based on the acquired connection state, a state of a ride or absence of the worker in the vehicle.

14. The state estimation was method according to claim 13, wherein the measurement result of the second sensor is at least one of a velocity, an acceleration, an angular velocity, or an altitude of the worker, and the method comprising estimating, based on a measurement result about at least one of the velocity, the acceleration, the angular velocity, or the altitude of the worker, a state of work or standby of the worker.

15. The state estimation method according to claim 3, comprising:

analyzing by an analysis circuit and based on the estimated state related to work of the worker and a delivery plan of the vehicle, a relationship between the delivery plan and a delivery record; and outputting an analysis result.

16. A state estimation system comprising:

a vehicle-mounted apparatus mounted in a vehicle in which a worker is to ride and configured to provide a measurement result about a state of the vehicle;

a terminal carried by the worker and configured to provide a measurement result about a state of the worker; and a state estimation apparatus configured to estimate, based on the measurement result provided by the vehicle-mounted apparatus and the measurement result provided by the terminal, a work state of the worker, wherein:

the measurement result provided by the vehicle-mounted apparatus is a position of the vehicle and a velocity of the vehicle;

the measurement result provided by the terminal is a position of the worker;

the state estimation apparatus is configured to estimate, based on a change in a distance between the vehicle and the worker, a state related to a ride of the worker in the vehicle; and the state estimation apparatus is configured to estimate, based on a measurement result about the velocity of the vehicle, a state of movement of the worker by the vehicle.

17. A state estimation apparatus comprising:

a first acquisition circuit configured to acquire a measurement result of a first sensor, the first sensor being a sensor mounted in a vehicle in which a worker is to ride and being configured to measure a state of the vehicle;

a second acquisition circuit configured to acquire a measurement result of a second sensor, the second sensor being a sensor carried by the worker and being configured to measure a state of the worker; and an estimation circuit configured to estimate, based on the measurement result of the first sensor and the measurement result of the second sensor, a state related to work of the worker, wherein:

the measurement result of the first sensor is a position of the vehicle and a velocity of the vehicle;

the measurement result of the second sensor is a position of the worker and at least one of a velocity, an acceleration, an angular velocity, or an altitude of the worker; and the estimation circuit is configured to:

estimate a state related to a ride of the worker in the vehicle;

estimate, based on a measurement result about at least one of the velocity, the acceleration, the angular velocity, or the altitude of the worker, a state of work or standby of the worker; and estimate, based on a measurement result about the velocity of the vehicle, a state of movement of the worker by the vehicle.

18. The state estimation apparatus according to claim 17, wherein the measurement result of the second sensor includes the acceleration and the altitude of the worker, and the estimation circuit estimates the state of work or standby of the worker based on a combination of (i) a comparison result between the acceleration of the worker and an acceleration threshold value and (ii) a comparison result between the altitude of the worker and an altitude threshold value.

* * * * *